June 6, 1939.  L. HECK ET AL  2,161,416
SOUND OPERATED CONTACT DEVICE
Filed Jan. 20, 1936
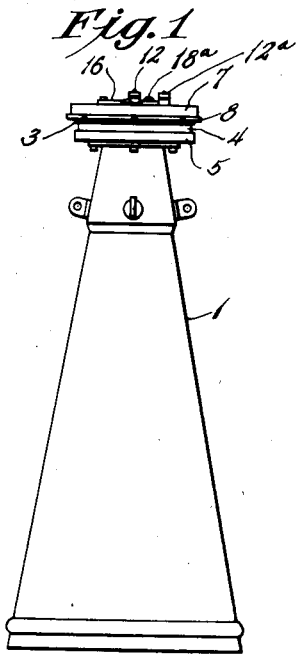
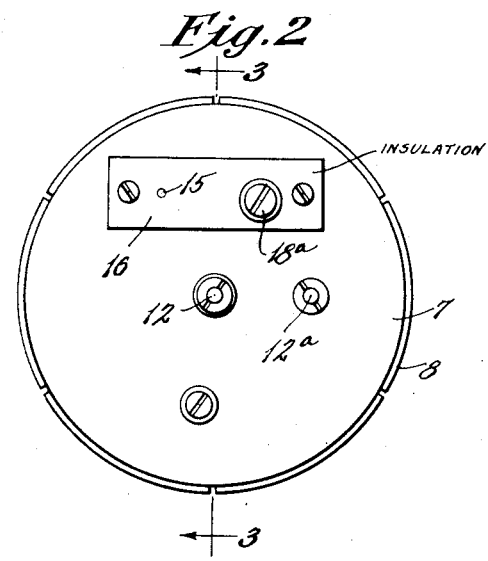
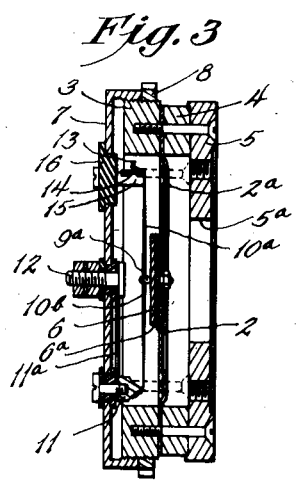
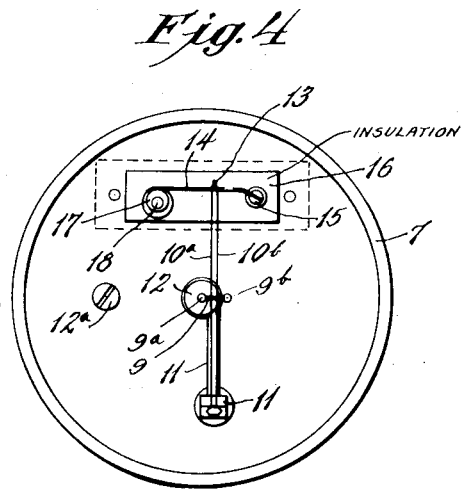
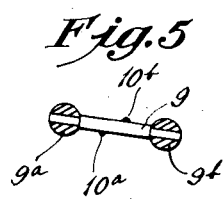
Inventor
Ludwig Heck and
Richard Schwarz
By A. D. Adams
Attorney Patented June 6, 1939

2,161,416

UNITED STATES PATENT OFFICE 2,161,416

SOUND OPERATED CONTACT DEVICE

Ludwig Heck, Munich, and Richard Schwarz, Berlin-Mariendorf, Germany, assignors to Askania-Werke A. G., a German company Application January 20, 1936, Serial No. 59,958
In Germany December 12, 1933

5 Claims. (Cl. 200—52)

This invention relates to improvements in devices for determining the altitude of aircraft by the echo method; that is, by measuring the time of transit of a sound impulse emitted from the airplane and returned to it by reflection from the surface of the earth. The echo is received by sound receivers which determine the instant of return by means of electrical relay connections. The well known sound receivers employed heretofore, using a sound receiving diaphragm and electrodes formed by carbon pieces, being unconnectedly arranged on said diaphragm, are not very suitable for sound locating devices because the carbon pieces receive all accelerations, vibrations and sudden movements of the aircraft on turns, sudden risings or fallings, or other movements, and thereby begin to oscillate, imitating sound impulses. These and other disadvantages are overcome by this invention.

This application is filed as a continuation-in-part of copending application Ser. No. 757,202, filed December 12, 1934.

An object of this invention is to improve the microphone, especially to devise an arrangement of the movable electrode so that it will be set in oscillation by the diaphragm but will not be affected by vibrations and sudden movements of the aircraft. The microphone according to the invention can be used in the same way as shown and described in the copending Wunsch application Ser. No. 699,941, especially as shown in Fig. 3 of the said application.

These and such other aims and objects of the invention as may hereinafter appear will be readily understood from the following description taken in connection with the accompanying drawing showing one embodiment of the invention for illustrative purposes, wherein:

Fig. 1 shows the preferred form of microphone attached to a sound receiving horn;

Fig. 2 is a view of the back of the microphone unit;

Fig. 3 is a sectional view taken on the line 3—3 of Fig. 2;

Fig. 4 is a face view of the inside of a back plate showing the vibrating contact; and Fig. 5 is an enlarged detailed view showing the method of mounting the vibrating contact upon parallel wires.

The microphone, according to the present invention, is provided with two solid electrodes, one carried by the sound receiving diaphragm, and the other mounted upon a resilient support and normally maintained in resilient contact with the electrode on the diaphragm. In order to render the microphone non-responsive to engine vibrations and other extraneous vibrations, the movable electrode is supported in a balanced vibratory support and is biased by resilient means to press against the diaphragm electrode with a force larger than the greatest force of vibrations which is likely to act on the microphone from extraneous sources on board and airplane. Preferably, the elastic force is made adjustable. Therefore, the electrode is suitably made in the form of a lever bearing a carbon piece at one end which is suitably balanced by another carbon piece at the other end of the lever. The lever is supported at two points near its centre, preferably by means of two elastic strings parallel with each other. A further advantage of this arrangement is that it provides a definite axis of oscillation about which the lever oscillates or moves after being influenced or set into motion by the diaphragm. The frequency of oscillation of the lever depends principally on the elasticity and tension of the strings and is therefore adjustable. By these means it will be understood that the frequency can be adjusted in a certain relation to the natural frequency of the diaphragm. Therefore, the range of frequency to which the microphone responds can be very limited, because such a microphone is preferably so adjusted that the fundamental frequency of the diaphragm is the same frequency as one of the higher harmonics of the electrode lever, and, when so adjusted, it reacts only to sound impulses which cause harmonic oscillations of the diaphragm. Therefore, disturbances by other frequencies, e. g. the noise of the motor, will not affect the microphone.

Referring more particularly to the drawing, numeral 1 indicates a sound collecting horn or funnel which supports the microphone unit at its upper end. The construction of the microphone unit is illustrated on an enlarged scale in Figs. 2 to 5. As will be seen from the drawing, the microphone unit is formed of a diaphragm 2 which is clamped at its periphery between two heavy rings 3 and 4, and this assembly is secured to a face plate 5 by which the microphone is secured to the sound collecting horn, the face plate being provided with a central sound opening 5a for admitting sound to the front of the diaphragm from the horn. At the center of the diaphragm and on the back side thereof is mounted a carbon disk 6. This disk may be mounted upon the diaphragm in any suitable manner, as by a shallow metallic cup 6a provided with a stem passing through a hole in the center of the diaphragm and a nut screwed onto the stem on the opposite side of the diaphragm. The back of the microphone is closed by a back plate 7 adjustably secured to the ring 3 by means of a threaded connection between the peripheral face of the ring 3 and the internal face of the cylindrical flange on the plate 7. A suitable threaded locking ring 8 is provided for locking the ring 3 and the plate 7 in any desired adjusted position.

The back plate 7 has mounted on the front face thereof a contact which cooperates with the carbon disk 6 mounted on the back of the diaphragm 2. The construction of this contact is shown in detail in Fig. 5, where it will be seen that the contact is formed of a conducting lever bar 9 provided with two carbon balls or pieces 9a and 9b at the ends thereof, the ball 9a being arranged to contact with the carbon disk 6. The bar 9 is mounted approximately at the center of two parallel strings or wires 10a and 10b, one wire passing under the bar while the other passes above the bar, as shown in Fig. 5, for the purpose of causing the carbon piece 9a to press against the carbon disk 6. The bar 9 may be secured to the wires in any suitable manner, conveniently, by soldering, as shown in Fig. 5. The ends of the wires 10a and 10b are secured as by soldering to a bridge member 11 insulated from the back plate 7, and connected by a strip 11a to an insulated terminal 12 mounted at the center of the plate 7. The other terminal 12a is connected directly to the plate 7. The wires 10a and 10b are preferably formed of a single piece of wire looped around a pin 13 carried by a leaf spring 14, one end of which is secured in a pin 15 mounted in an insulating block or insert 16. The other end of spring 14 bears against an eccentric 17 mounted upon a pin 18 journaled in the block 16 and provided with an adjusting head 18a on the back side of the back plate 7. By rotating the head 18a, the tension of the wires 10a and 10b may be adjusted.

In using the microphone of the present invention, the natural frequency of the resilient support for the contact 9a is adjusted to a relatively low frequency, preferably above the disturbing frequencies normally occurring on an airplane. For example, the engine vibrations usually have frequencies varying between zero and 75 cycles per second, and a suitable frequency for the resilient support is 100 cycles per second. This frequency is not critical and may be varied through rather wide limits. The natural frequency of the diaphragm is preferably chosen to correspond with one of the harmonic frequencies of the vibrating support. For example, it will be assumed that the diaphragm has a natural frequency of 2400 cycles per second. It will be understood that the diaphragm responds to 2400 cycles or higher harmonic frequencies, but in order to render the diaphragm less sensitive to the higher harmonic frequencies, suitable annular corrugations 2a may be provided on the diaphragm if desired.

From the foregoing description it will be seen that the movable electrode 9a is mounted upon a resilient support having a natural period of vibration which may be adjusted to any desired value within certain limits. Furthermore, the resilient support for the electrode is balanced as to masses about the axis of oscillation so that vibrations transmitted to the electrode through the support will not set it in oscillation, but vibrations transmitted to the electrode from the diaphragm will cause the electrode to oscillate about the axis of oscillation of the resilient support and will break contact with the electrode 6 on the diaphragm. The threaded connection between the ring 3 and the back plate 7 provides for the ready adjustment of the pressure exerted by the electrode 9a on the electrode 6. The pressure between the two electrodes is also dependent upon the tension of the wires 10a and 10b which is adjustable by head 18a.

The microphone is normally adjusted so that electrode 9a presses against the electrode 6 with a force sufficient to prevent separation of the two electrodes by the force normally transmitted through the diaphragm from the disturbing frequencies of the airplane.

With the microphone constructed and adjusted as indicated above, the operation is as follows: Since vibrations transmitted to the movable electrode through its support do not set the electrode into vibration, and since the diaphragm 2 responds very feebly to the disturbing frequencies, the contact 9a will follow the feeble vibrations of the diaphragm 2 without breaking contact with the electrode 6. Assuming now that sound waves of a frequency corresponding to the natural frequency of the diaphragm are received (2400 cycles, which is the frequency employed in the system), the diaphragm 2 will be set into vigorous vibration, and these vibrations will be transmitted to electrode 9a and the resilient support for this electrode will be set into oscillation at its natural frequency. Accordingly, vibration of the resilient support of electrode 9a will cause the periodic interruption of contact between electrodes 6 and 9a according to the frequencies of these two elements. In other words, contact between the two electrodes will be made and broken at the rate of 2400 cycles per second in groups recurring at the rate of 100 cycles per second. The resistance of the microphone while electrode 9a rests upon electrode 6 is of the order of 600 ohms, but, when electrode 9a is set into oscillation as described above, the apparent resistance increases to a value of the order of ten million ohms, or practically an open circuit.

The manner in which the microphone disclosed herein is employed in the system for indicating the altitude of aircraft is clearly disclosed in our copending application Ser. No. 48,782, filed November 7, 1935.

Obviously, the present invention is not restricted to the particular embodiment thereof herein shown and described. Moreover, it is not indispensable that all the features of the invention be used conjointly, since they may be employed advantageously in various combinations and sub-combinations.

What is claimed is:

1. A sound receiving contact device which is non-responsive to disturbing frequencies comprising, in combination, a diaphragm which is tuned to the frequency of the sound intended to receive; a first electrode carried by said diaphragm; a second electrode cooperating with said first electrode and carried by resilient supporting means; said resilient supporting means normally maintaining said second electrode in contact with said first electrode and being tuned to a frequency outside of the range of the disturbing frequencies and below the natural frequency of said diaphragm for periodically breaking the contact between said electrodes upon reception of a sound.

2. A sound receiving contact device which is non-responsive to disturbing frequencies comprising, in combination, a diaphragm which is tuned to the frequency of the sound intended to receive; a first electrode carried by said diaphragm; a second electrode cooperating with said first electrode and carried by resilient supporting means; said resilient supporting means normally maintaining said second electrode in contact with said first electrode and being tuned to a frequency outside of the range of the disturbing frequencies and below the natural frequency of said diaphragm for periodically breaking the contact between said electrodes upon reception of a sound; and means for varying the tension of said resilient means.

3. A sound receiving contact device which is non-responsive to disturbing frequencies comprising, in combination, a diaphragm being tuned to the frequency of the sound intended to receive; a first electrode carried by said diaphragm; a second electrode cooperating with said first electrode; a pair of tensioned parallel strings supporting said second electrode for oscillation about an axis substantially parallel to the strings and normally maintaining said second electrode in contact with said first electrode; said strings being tuned to a frequency outside of the range of the disturbing frequencies and below the natural frequency of said diaphragm for periodically breaking the contact between said electrodes upon reception of a sound; the second electrode having balanced masses with respect to its axis of oscillation.

4. A device as claimed in claim 3 in which means is provided for varying the tension of the parallel strings.

5. A sound receiving contact device which is non-responsive to disturbing frequencies comprising, in combination, a diaphragm being tuned to the frequency of the sound intended to receive; a first electrode carried by said diaphragm; a second electrode cooperating with said first electrode; a lever carrying said second electrode on one end; a pair of tensioned, parallel strings supporting said lever transversely thereof for oscillation about an axis substantially parallel to the strings and secured to the middle part of said lever; said lever having at its other end balanced masses with respect to its axis of oscillation; said strings normally maintaining said second electrode in contact with said first electrode and being tuned to a frequency outside of the range of disturbing frequencies and below the natural frequency of said diaphragm for periodically breaking the contact between said electrodes upon reception of a sound.

LUDWIG HECK.
RICHARD SCHWARZ.